(No Model.)
G. WEBSTER.
DEHORNING IMPLEMENT.
No. 586,806. Patented July 20, 1897.
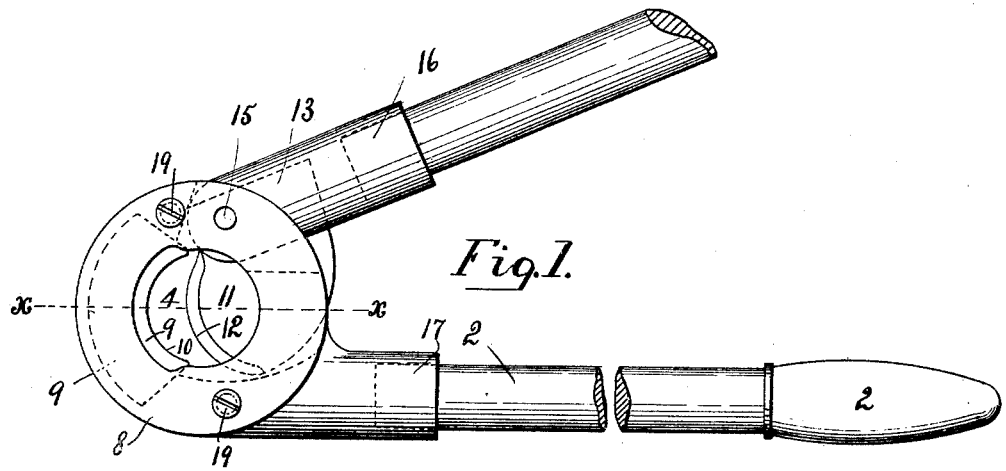
Fig. 1.
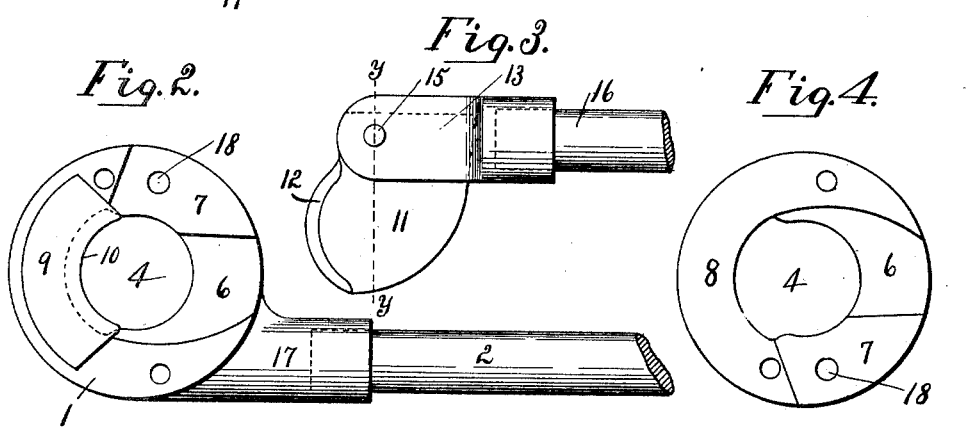
Fig. 2. Fig. 3. Fig. 4.
Fig. 5.
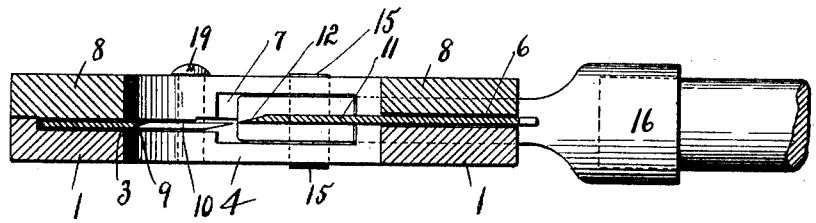
Fig. 6.
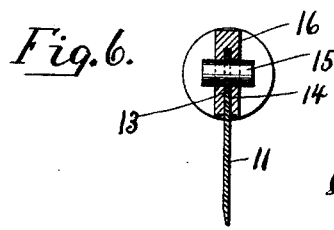
Witnesses.
Walter C. Pusey.
A. V. Groupe
Inventor.
George Webster,
per Joshua Pusey,
Attorney.

UNITED STATES PATENT OFFICE.

GEORGE WEBSTER, OF CHRISTIANA, PENNSYLVANIA, ASSIGNOR OF ONE-HALF TO ISAAC H. DICKINSON, OF QUARRYVILLE, PENNSYLVANIA.

DEHORNING IMPLEMENT.

SPECIFICATION forming part of Letters Patent No. 586,806, dated July 20, 1897.

Application filed October 14, 1896. Serial No. 608,814. (No model.)

*To all whom it may concern:*

Be it known that I, GEORGE WEBSTER, a citizen of the United States, residing at Christiana, in the county of Lancaster and State of Pennsylvania, have invented certain new and useful Improvements in Implements for Dehorning Cattle, of which the following is a full, clear, and exact description, reference being had to the accompanying drawings, of which—

Figure 1 is a side elevation; Fig. 2, a side elevation with the upper plate and one of the blades removed; Fig. 3, a side elevation of the pivoted handle and blade detached. Fig. 4 is the superposed plate removed and inverted. Fig. 5 is a section, enlarged, on the line $xx$, Fig. 1. Fig. 6 is a section on line $yy$, Fig. 3.

The object of my invention is to provide an implement for dehorning cattle which shall be strong, easily operated, efficient, and that may be readily and cheaply made and the working parts readily renewed when necessary.

The precise character, construction, and mode of operation of the invention, which is quite simple, will be clearly understood from the following description, the novel features thereof being duly pointed out.

Referring to the accompanying drawings, which represent the preferred specific form of the invention, 1 is an annular plate, to the rear lower part of which is secured a handle 2. It has also a depression 3, Fig. 5, in its inner face, the outer part of which is closed and the rear or inner part opening out to a central aperture 4 in the plate. The latter has also in its face on the opposite side of the aperture a depression 6 and another greater depression 7, both of suitable dimensions, for the purposes hereinafter appearing.

8 is a second plate, (shown detached and inverted in Fig. 4,) similar in form to the first and with an aperture 4 therein corresponding with the said aperture in the other plate, and having also depressions 6 and 7 corresponding with those of the first plate.

9 is a knife or blade having a beveled cutting edge 10, and is adapted to lie snugly in the depression 3 of plate 1, with its top surface flush with the top of depression 6 and the concave cutting edge projecting some distance into the aperture 4.

11 is a second knife or blade with a convex cutting edge 12. This blade is secured to the end of a handle 16 in any convenient manner, but preferably as follows: The knife is extended to form a shank 13, as shown, rectangular at the end, and the end of the handle is provided with a slot 14, closed at the rear for the reception of the square shank 13. A pin 15, which constitutes a pivot-pin, as hereinafter mentioned, is driven through registering holes in the handle and the shank of the blade.

I prefer to make the handles of wood, the end of the handle 16 being inserted in a metal part or head, (which is in effect a continuation of the handle,) to which blade 11 is secured, and the handle 2 being inserted in a socket in a rear projection 17 from the plate 1, (practically a continuation of the handle,) all as indicated in the drawings. The said two plates 1 and 8 are provided with holes 18, which when the plates are put together register with each other.

In putting the parts together blade 9 is first laid in the depression 3 of plate 1, the handle 16 and attached blade are brought into position, and a projecting end of the pin 15 is entered into hole 18 in plate 1. Plate 8 is superposed upon plate 1, with its depressions 6 and 7 brought to register with those, respectively, of the latter plate, and its hole 18 to register with pin 15, the end of the latter entering said hole. The two plates are then secured together by means of screws or rivets 19, Fig. 1, and the implement is now ready for use, as follows:

The handles are drawn apart, which causes one blade to move away from the other in the arc of a circle, whose center is that of the pivot-pin 15, thus leaving a passage-way through the aperture 4. The implement is now brought into position and placed over the horn of the animal, so that the horn projects through said opening. The handles are now drawn forcibly together, and the result is that the sharp edges of the blades, in connection also with the shearing cut which manifestly takes places, the horn will be cut off.

It will be seen that while the end of the handle to which blade 11 is attached is free to move in the wide slot between the plates formed by the depressions 7 the said blade works in and is guided in the slot formed by the depressions 6. It will also be obvious that the parts may readily be separated, when desired, in order to sharpen or renew the blades, and that when the latter are in place they are firmly braced to resist the strain in the cutting-off operation.

I do not limit myself to the precise construction shown and described, as the same may be altered without changing the principle or essential construction of the invention.

Having thus described my invention, I claim as new and desire to secure by Letters Patent—

1. In a dehorning implement of the character described, having two coacting knives, one fixed, the other pivotally mounted, the combination of the apertured plate, 1, having the depression or socket, 3, therein, opening into said aperture, the fixed knife fitted in said socket, together with the apertured plate, 8, superposed upon and secured to the first-mentioned plate whereby the said knife is secured and braced, substantially as specified.

2. In a dehorning implement, the combination of the superposed apertured plates, 1 and 8, one of which is provided with the depression or socket, 3, and both plates provided with the opposite depressions, 6 and 7, forming a slot, between the plates, the knife in said socket, 3, its cutting edge projecting into said aperture, the knife pivoted in said slot with its cutting edge projecting into said aperture substantially opposite to the cutting edge of the first-mentioned knife, together with the handle connected to the plate, 1, and the handle connected to the pivoted knife, substantially as and for the purpose described.

In testimony whereof I have hereunto affixed my signature in the presence of two subscribing witnesses.

GEORGE WEBSTER.

Witnesses:
NORA A. HARRAR,
J. A. HARRAR.